(12) United States Patent
Rommel

(10) Patent No.: US 9,440,348 B2
(45) Date of Patent: Sep. 13, 2016

(54) HAND TOOL GEARING UNIT

(71) Applicant: Robert Bosch GmbH, Stuttgart (DE)

(72) Inventor: Julia Rommel, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 14/200,181

(22) Filed: Mar. 7, 2014

(65) Prior Publication Data

US 2014/0260745 A1    Sep. 18, 2014

(30) Foreign Application Priority Data

Mar. 12, 2013 (DE) .................. 10 2013 204 278
Mar. 12, 2013 (DE) .................. 10 2013 204 281
Mar. 12, 2013 (DE) .................. 10 2013 204 284
Jan. 31, 2014 (DE) .................. 10 2014 201 738

(51) Int. Cl.
| | |
|---|---|
| *B25F 5/00* | (2006.01) |
| *F16H 1/00* | (2006.01) |
| *F16H 1/20* | (2006.01) |
| *B25F 5/02* | (2006.01) |

(52) U.S. Cl.
CPC .............. *B25F 5/001* (2013.01); *B25F 5/02* (2013.01); *F16H 1/006* (2013.01); *F16H 1/203* (2013.01); *Y10T 74/19665* (2015.01)

(58) Field of Classification Search
CPC .................. B25F 5/001; F16H 1/006
USPC ...................... 173/48, 216; 74/417
See application file for complete search history.

(56) References Cited

U.S. PATENT DOCUMENTS

| | | | | |
|---|---|---|---|---|
| 2,348,266 A | * | 5/1944 | Selby | ............ B23Q 1/5406 74/385 |
| 2002/0029647 A1 | * | 3/2002 | Brooks | ............ B60K 17/04 74/424 |
| 2008/0289843 A1 | * | 11/2008 | Townsan | ............ B25B 21/00 173/216 |

FOREIGN PATENT DOCUMENTS

| | | |
|---|---|---|
| DE | 100 01 091 A1 | 7/2001 |
| DE | 10 2006 059 633 A1 | 6/2008 |
| EP | 1 319 478 A2 | 6/2003 |

* cited by examiner

*Primary Examiner* — Nathaniel Chukwurah
(74) *Attorney, Agent, or Firm* — Maginot, Moore & Beck LLP

(57) ABSTRACT

A hand tool gearing unit includes a fixed housing, a pivot housing mounted pivotably relative to the fixed housing about a pivot axis, a driving gearwheel, and a driven gearwheel mounted in the pivot housing. The hand tool gearing unit further includes a connecting unit which transmits a rotational movement from the driving gearwheel to the driven gearwheel.

22 Claims, 6 Drawing Sheets

1

HAND TOOL GEARING UNIT

This application claims priority under 35 U.S.C. §119 to patent application no. DE 10 2013 204 278.7, filed on Mar. 12, 2013 in Germany, DE 10 2013 204 281.7, filed on Mar. 12, 2013 in Germany, DE 10 2013 204 284.1, filed on Mar. 12, 2013 in Germany, and DE 10 2014 201 738.6, filed on Jan. 31, 2014 in Germany, the disclosures of which are incorporated herein by reference in its entirety.

BACKGROUND

A hand tool gearing unit comprising a fixed housing, comprising a pivot housing mounted pivotably relative to the fixed housing about a pivot axis, comprising a driving gearwheel and comprising a driven gearwheel mounted in the pivot housing has already been proposed.

SUMMARY

The disclosure is based on a hand tool gearing unit comprising a fixed housing, comprising a pivot housing mounted pivotably relative to the fixed housing about a pivot axis, comprising a driving gearwheel and comprising a driven gearwheel mounted in the pivot housing.

It is proposed that the hand tool gearing unit has a connecting unit which transmits a rotational movement from the driving gearwheel to the driven gearwheel. A "fixed housing" is intended to be understood, in particular, as meaning a housing in which at least one driving gearwheel of the hand tool gearing unit is mounted in particular in an indirectly rotatable manner. The driving gearwheel is preferably mounted rotatably relative to the fixed housing in a gearing housing of a gearing of a hand tool having the hand tool gearing unit according to the disclosure. An axis of rotation of the driving gearwheel is preferably immovable relative to the fixed housing. The fixed housing is preferably formed integrally with a machine housing of the hand tool having the hand tool gearing unit. Alternatively, the fixed housing could be provided to be fixedly connected to a machine housing of a hand tool so as to be releasable by an operator. In an operationally ready state, the machine housing, the fixed housing and in particular also the gearing housing are preferably connected to one another immovably relative to one another. A "driving gearwheel" is intended to be understood, in particular, as meaning a gearwheel which, in terms of action, is arranged in particular directly in front of a connecting unit of the hand tool gearing unit, said connecting unit transmitting a rotational movement from the driving gearwheel to the driven gearwheel. In an operationally ready state, the driving gearwheel is preferably arranged in terms of action between a gearing of the hand tool and the connecting unit. In at least one operating state, the gearing of the drive unit in particular substantially reduces a rotational speed of a motor of the drive unit to a rotational speed of an insertable tool fastening means of the hand tool gearing unit. Alternatively or in addition, in an operationally ready state, the driving gearwheel could be connected to an insertable tool fastening means of the hand tool coupled to the hand tool gearing unit for rotation with said insertable tool fastening means. The use of "pivotably mounted" is intended to be understood, in particular, as meaning that the pivot housing is fastened relative to the fixed housing so as to be rotatable by the operator by at least 90°, advantageously by at least 180°, and particularly advantageously by at least 270°. In particular, the pivot housing is rotatable relative to the fixed housing by not more than 360°. A "pivot housing" is intended to be understood, in particular, as meaning a housing part of the hand tool gearing unit, said housing part, in an operationally ready state, being mounted pivotably relative to the fixed housing of the hand tool gearing unit. The pivot housing is preferably mounted pivotably relative to a handle of the hand tool having the hand tool gearing unit. The insertable tool fastening means is preferably mounted rotatably in the pivot housing. An axis of rotation of the driven gearwheel and/or an axis of rotation of the insertable tool fastening means are/is preferably immovable relative to the pivot housing. A "driven gearwheel" is intended to be understood, in particular, as meaning a gearwheel which is arranged in terms of action in particular directly behind the connecting unit. The driven gearwheel is preferably arranged in terms of action between the connecting unit and the insertable tool fastening means. In an operationally ready state, the driven gearwheel is advantageously connected to the insertable tool fastening means for rotation therewith. A "connecting unit" is intended to be understood, in particular, as meaning a unit which directly connects the driving gearwheel and the driven gearwheel in terms of action. All of the parts of the connecting unit are preferably connected fixedly to one another so as to rotate together. Alternatively, the connecting unit could have two or, in particular, three gearwheels in engagement with one another. An axis of rotation of the connecting unit is advantageously oriented perpendicularly to the axis of rotation of the driven gearwheel and/or the axis of rotation of the driving gearwheel. The configuration according to the disclosure of the hand tool gearing unit makes it possible in a structurally simple manner to provide a hand tool with which particularly comfortable work, in particular even in corners, is possible.

Furthermore, it is proposed that the hand tool gearing unit comprises at least one bearing unit which is provided to rotatably mount the connecting unit on at least one side only in the pivot housing, as a result of which a particularly exact arrangement of the driven gearwheel relative to the connecting unit is possible in different operating states. A "bearing unit" is intended to be understood, in particular, as meaning a unit which is provided to rotatably fasten the connecting unit at least in one direction perpendicular to the axis of rotation of the connecting unit. The bearing unit comprises at least one bearing means appearing expedient to a person skilled in the art, but preferably a ball bearing, a rolling bearing and/or particularly preferably a plain bearing. The bearing unit advantageously comprises at least two bearing means spaced apart from each other. The bearing unit could be at least partially formed integrally with the pivot housing and/or could be integrated in the pivot housing. The use of "on at least one side" is intended to be understood, in particular, as meaning that the connecting unit directly derives a bearing force only via the pivot housing at least in one region which is separated at least by a plane, which runs through a center point of the connecting unit and is oriented perpendicularly to a main extent of the connecting unit, from a region forming another side. The connecting unit is preferably mounted on both sides only in the pivot housing. Alternatively, the connecting unit could be mounted merely on one side only in the pivot housing. "Only" is intended to be understood, in particular, as meaning that the bearing unit absorbs all of the forces, which are transmitted by the connecting unit to the bearing means, at the pivot housing. In particular, the bearing unit does not transmit any forces from the pivot housing to the fixed housing. In particular, the hand tool gearing unit does not have any bearing means which mount the connecting unit directly in the fixed housing. In particular, "provided" is intended to be understood as meaning specially designed and/or equipped. The use of "mount in the pivot housing" is intended to be understood, in particular, as meaning that the bearing unit transmits a bearing force in particular directly to the pivot housing. In particular, the pivot housing transmits at least some of the bearing forces of the bearing unit from the bearing unit to the fixed housing.

In a further refinement, it is proposed that the pivot housing is provided to connect the connecting unit and the driven gearwheel to form a preassemblable assembly, as a result of which advantageous production is possible. A "preassemblable assembly" is intended to be understood, in particular, as meaning that the pivot housing, the connecting unit, the driven gearwheel, advantageously the insertable tool fastening means and preferably the bearing unit are formed separately from the fixed housing and so as to be connectable to one another in a stable manner per se. Housing parts of the pivot housing are preferably provided to be fastened to one another and, in this state, to fasten the connecting unit, the driven gearwheel, advantageously the insertable tool fastening means and preferably the bearing unit.

Furthermore, it is proposed that the pivot housing is advantageously mounted directly in the fixed housing in a manner pivotable about a pivot axis, as a result of which a simple construction can be achieved.

Furthermore, it is proposed that the pivot housing has at least one bearing surface for mounting in the fixed housing, as a result of which a particularly inexpensive production and a compact design are possible. Alternatively, the hand tool gearing unit could have a bearing means which mounts the pivot housing pivotably directly in the fixed housing. A "bearing surface" is intended to be understood, in particular, as meaning a surface which, in at least one operating state, transmits a bearing force advantageously directly to the fixed housing. The pivot housing advantageously has two bearing surfaces, which are spaced apart from each other, for the mounting in the fixed housing. The bearing surface is preferably designed as a circumferential surface of the pivot housing, in particular of a formation on the pivot housing. The formation is advantageously of at least substantially cylindrical and/or conical design. In particular, the fixed housing has a bearing surface corresponding to the bearing surface. The fixed housing preferably has a recess corresponding to the formation on the pivot housing. Alternatively or in addition, the fixed housing could have a formation and the pivot housing could have a recess. In addition, the fixed housing could have two fastening means which are each provided to bring about at least one force on the pivot housing in two opposite directions parallel to the pivot axis.

Furthermore, it is proposed that the bearing unit has two bearing means which rotatably mount the connecting unit in the pivot housing on two mutually opposite sides along the pivot axis, as a result of which a particularly stable mounting can be achieved. In particular, the bearing means mount the connecting unit directly in the pivot housing. A "bearing means" is intended to be understood as meaning a bearing appearing expedient to a person skilled in the art, but preferably a plain bearing, a ball bearing and/or a needle bearing. In this context, "mutually opposite sides along the pivot axis" is intended to be understood, in particular, as meaning that the bearing means are provided to bring about a bearing force on the pivot housing and/or on the connecting unit in two different regions which are spaced apart from each other in a direction parallel to the pivot axis, specifically by more than 5 mm, advantageously by more than 10 mm, particularly advantageously by more than 20 mm.

Furthermore, it is proposed that the bearing unit has two bearing means which rotatably mount the connecting unit on a first side in the pivot housing and on a second side opposite the first side in the fixed housing, as a result of which a particularly compact design is possible in a structurally simple manner.

Furthermore, it is proposed that the hand tool gearing unit comprises a locking unit with a locking element which is provided to lock the pivot housing in at least one position relative to the driving gearwheel, as a result of which it is possible in a structurally simple manner to provide a hand tool with which comfortable working is possible. In particular, an inadvertent adjustment of a position of the pivot housing can be avoided. A "locking element" is intended to be understood, in particular, as meaning an element which, in at least one operating state, brings about a force on the pivot housing, said force preventing a pivoting movement of the pivot housing about the designated pivot axis. The locking element is advantageously mounted non-rotatably in the fixed housing. The locking unit preferably has an operating element which is provided to close and/or to release the locking means upon actuation by the operator. In this context, a "position" is intended to be understood, in particular, as meaning an orientation of the pivot housing relative to the fixed housing. In particular, the term "lock" is intended to be understood as meaning fasten in a position about the designated pivot axis.

In a further refinement, it is proposed that the locking unit is provided to lock the pivot housing in a plurality of positions, as a result of which the particularly comfortable working can be achieved in different working situations. The locking unit preferably automatically latches the pivot housing in the positions. "A plurality of positions" are intended to be understood, in particular, as meaning a plurality of different orientations of the pivot housing relative to the fixed housing. Alternatively, the locking unit could be provided to lock the pivot housing in precisely one position, in which the axis of rotation of the driving gearwheel is preferably oriented parallel to the axis of rotation of the driven gearwheel.

Furthermore, it is proposed that the positions are arranged regularly about the pivot axis, as a result of which an advantageously intuitive setting of a desired position is possible in a particularly simple manner. In particular, the term "regularly" is intended to be understood as meaning that at least two of the positions are at an angle which is identical to a third position of the positions. The positions are preferably oriented symmetrically with respect to the axis of rotation of the driving gearwheel. The positions are particularly preferably different from an adjacent position by in each case 90°, advantageously by 45° and particularly advantageously in each case by 22.5°. The locking unit advantageously shows the user, in particular optically and/or advantageously haptically, an orientation of the pivot housing in one of the positions.

Furthermore, it is proposed that, in at least one operating state, the locking element produces a form-fitting connection with the pivot housing, as a result of which particularly stable locking is possible in a structurally simple manner. A "form-fitting connection" is intended to be understood, in particular, as meaning that surfaces lying next to one another of components which are connected to one another in a form-fitting manner exert a retaining force on one another, the retaining force acting in a normal direction of the surfaces. In particular, the components are in geometrical engagement with one another. The locking element is preferably connected fixedly to the fixed housing. Alternatively, the locking element could be connected fixedly to the pivot housing and, in at least one operating state, could produce a form-fitting connection with the fixed housing. Alternatively or in addition to the form-fitting connection, the locking element could produce a frictional connection in at least one operating state.

In addition, it is proposed that the locking unit has a locking spring which, in at least one operating state, presses onto the locking element, as a result of which particularly comfortable and secure use can be achieved. A "locking spring" is intended to be understood, in particular, as meaning a spring which, in at least one operating state, displaces the locking element into a locking position. The operator preferably has to displace the locking element counter to a spring force of the locking spring in order to release the locking.

Furthermore, it is proposed that the locking element is mounted displaceably substantially perpendicularly to the pivot axis, as a result of which the locking element can be arranged in a structurally simple manner in the direction of a handle. In particular, the use of "substantially" with regard to a direction is intended to be understood as meaning that the direction deviates from the stated direction by less than 30°, advantageously by less than 15°, and particularly advantageously by less than 5°. The locking element is preferably fastened so as to be movable at least substantially in a translatory manner. Alternatively, the locking element could be fastened pivotably and could, in particular, have an eccentric and/or a thread.

Furthermore, it is proposed that the hand tool gearing unit has a fixed housing which comprises an outer side which is oriented at least substantially parallel to the axis of rotation of the driven gearwheel and is spaced apart from the axis of rotation of the driven gearwheel by less than 12 mm, advantageously less than 8 mm, and particularly advantageously by less than 6 mm, as a result of which screwing is possible at locations which are particularly difficult to reach. The use of "along the pivot axis of the pivot housing" is intended to be understood, in particular, as meaning a straight line oriented parallel to the pivot axis of the pivot housing. In this context, "at least substantially parallel" is intended to be understood, in particular, as meaning that an orientation of the outer side of the fixed housing and an orientation of the axis of rotation of the driven gearwheel differ by less than 15°.

Furthermore, it is proposed that the locking element is arranged on a second side opposite the first side, as a result of which it is possible for there to be little need for construction space on the first side.

In an advantageous development of the disclosure, it is proposed that the locking element is mounted displaceably substantially parallel to the pivot axis, as a result of which a particularly compact construction is possible.

Furthermore, it is proposed that the hand tool gearing unit has two fastening means which are provided to pivotably fasten the pivot housing on two mutually opposite sides along the pivot axis, as a result of which a high degree of stability can be achieved. In particular, a "fastening means" is intended to be understood, in particular, as meaning a means which fastens the pivot housing directly to the fixed housing. The pivot housing and the fixed housing preferably each have two fastening means. In particular, the fastening means of the pivot housing are formed in a spatially separated manner from each other. In particular, the fastening means of the fixed housing are formed in a spatially separated manner from one another. The fastening means of the pivot housing advantageously each correspond with one fastening means of the fixed housing. "Mutually opposite sides along the pivot axis" is intended to be understood, in particular, as meaning that the fastening means are arranged in two different regions which are spaced apart from each other in a direction parallel to the pivot axis, specifically, advantageously, by more than 5 mm, particularly advantageously by more than 10 mm. The fastening means preferably enclose the pivot axis in each case over a plane which is oriented perpendicularly to the pivot axis. The fastening means are preferably formed at least partially integrally with the bearing means which mount the connecting unit rotatably on a first side in the pivot housing and on a second side opposite the first side in the fixed housing.

In addition, it is proposed that the fastening means are in each case provided to bring about forces on the pivot housing at least in two opposite directions parallel to the pivot axis, as a result of which a particularly high degree of stability can be achieved. In particular, it is avoided that the fastening means of the fixed housing bend inward and/or outward by pressure applied to the insertable tool fastening means. In this context, "in each case" is intended to be understood, in particular, as meaning that one of the two fastening means of the pivot housing in interaction with one of the two fastening means of the fixed housing is provided to produce a pivot connection via which a force is transmittable in two opposite axial directions. A particularly high degree of stability can be achieved by the configuration according to the disclosure of the hand tool gearing unit. In particular, it is avoided that the fastening means of the fixed housing bend inward and/or outward by a pressure applied to the insertable tool fastening means.

In a further refinement, it is proposed that the fastening means fasten the pivot housing in each case in a form-fitting manner parallel to the pivot axis, as a result of which a particularly stable fastening is possible in a structurally simple manner. "In a form-fitting manner" is intended to be understood, in particular, as meaning that surfaces bearing against one another of the fastening means, which are connected to one another in a form-fitting manner parallel to the pivot axis, exert a retaining force on one another, the retaining force acting in a normal direction of the surfaces. In particular, one fastening means in each case of the pivot housing is in geometrical engagement with a fastening means of the fixed housing.

Furthermore, it is proposed that the fastening means are designed as part of a tongue and groove connection, as a result of which particularly simple installation is possible. A "tongue and groove connection" is intended to be understood, in particular, as meaning a connection in which a region of one fastening means on a straight line oriented parallel to the pivot axis is arranged between two regions of a corresponding fastening means.

In addition, it is proposed that the driving gearwheel has an axis of rotation spaced apart radially from an axis of rotation of the driven gearwheel, as a result of which an axis of rotation can be positioned advantageously in a structurally simple manner. In particular, "spaced apart radially" is intended to be understood as meaning that the axis of rotation of the driving gearwheel and the axis of rotation of the driven gearwheel are at a distance in a direction perpendicular to at least one of the axes of rotation. The axis of rotation of the driving gearwheel and the axis of rotation of the driven gearwheel are preferably at a distance of greater than 2 mm, advantageously greater than 4 mm, and particularly advantageously greater than 8 mm, along an axis of rotation of the connecting unit. The axis of rotation of the driving gearwheel and the axis of rotation of the driven gearwheel are preferably at a distance of smaller than 40 mm, advantageously smaller than 30 mm, and particularly advantageously smaller than 20 mm, along the axis of rotation of the connecting unit. The axis of rotation of the driving gearwheel and the axis of rotation of the driven gearwheel are preferably orientable in parallel.

In a further refinement, it is proposed that the connecting unit is provided for transmitting a rotational movement from the driving gearwheel to the driven gearwheel in an at least substantially step-down-free manner, as a result of which a simple construction is possible. Furthermore, operation of a hand tool with a removable hand tool gearing unit is advantageously possible. The use of "in a substantially step-down-free manner" is intended to be understood, in particular, as meaning that at least one step-down ratio between the driving gearwheel and the driven gearwheel is between 10 and 1, advantageously between 5 and 1, and particularly advantageously between 2 and 1. The driving gearwheel and the driven gearwheel preferably have an identical rotational speed during operation. The driving gearwheel and the driven gearwheel preferably have an identical direction of rotation during operation, i.e. they rotate in the same direction with regard to a direction in terms of action.

Furthermore, it is proposed that the connecting unit has two gearwheels arranged separately from each other, as a result of which the axis of rotation of the driving gearwheel can be spaced apart from the axis of rotation of the driven gearwheel in a structurally simple manner. The use of "have two gearwheels arranged separately from each other" is intended to be understood, in particular, as meaning that the connecting unit has a first gearwheel which meshes with the driving gearwheel and has a second gearwheel which is different from the first gearwheel and meshes with the driven gearwheel.

Furthermore, it is proposed that the hand tool gearing unit has a hinged closure which is provided to at least partially close a pivoting region, as a result of which a penetration of dirt and moisture into the pivot housing of the hand tool gearing unit can advantageously be reduced. A "pivoting region" is intended to be understood, in particular, as meaning a region through which at least one output shaft, the insertable tool fastening means and/or an insertable tool fastened into the insertable tool fastening means emerge(s) from a pivot housing of the hand tool gearing unit in at least one of the plurality of possible positions about the pivot axis. In particular, the use of "at least partially close" is intended to be understood as meaning that the hinged closure covers a part of the pivoting range, which part is not covered by the output shaft, and/or the insertable tool fastening means covers a part of the pivoting range, which part is not covered by the output shaft, the insertable tool fastening means and/or the insertable tool fastened in the insertable tool fastening means, by more than 50%, advantageously by more than 75%, and particularly advantageously by more than 90%. The hinged closure preferably closes the pivoting range completely in every operationally ready state.

Furthermore, it is proposed that the hinged closure encloses the pivot axis over at least one plane, as a result of which particularly effective protection can be achieved in a structurally simple manner. In this connection, "encloses" is intended to be understood, in particular, as meaning that the hinged closure surrounds the pivot axis by more than 180°, advantageously more than 270°, and particularly advantageously by 360°.

Furthermore, the disclosure is based on a hand tool comprising a hand tool gearing unit according to the disclosure. A "hand tool" is intended to be understood, in particular, as meaning a workpiece-machining tool, and, advantageously, however, a hand drill, a hammer drill and/or strike hammer, a saw, a plane, a mortising machine, a grinder, an angle grinder, a garden implement, a multifunctional tool and/or, advantageously, a screwdriver.

The hand tool gearing unit according to the disclosure is not intended here to be limited to the above-described use and embodiment. In particular, in order to carry out a function described herein, the hand tool gearing unit according to the disclosure can have a number of individual elements, components and units differing from the number mentioned herein.

BRIEF DESCRIPTION OF THE DRAWINGS

Further advantages emerge from the description below of the drawing. The drawing illustrates three exemplary embodiments of the disclosure. The drawing, the description and the claims contain numerous features in combination. A person skilled in the art will expediently also consider the features individually and put them together to form meaningful further combinations.

DETAILED DESCRIPTION

Figure 1:
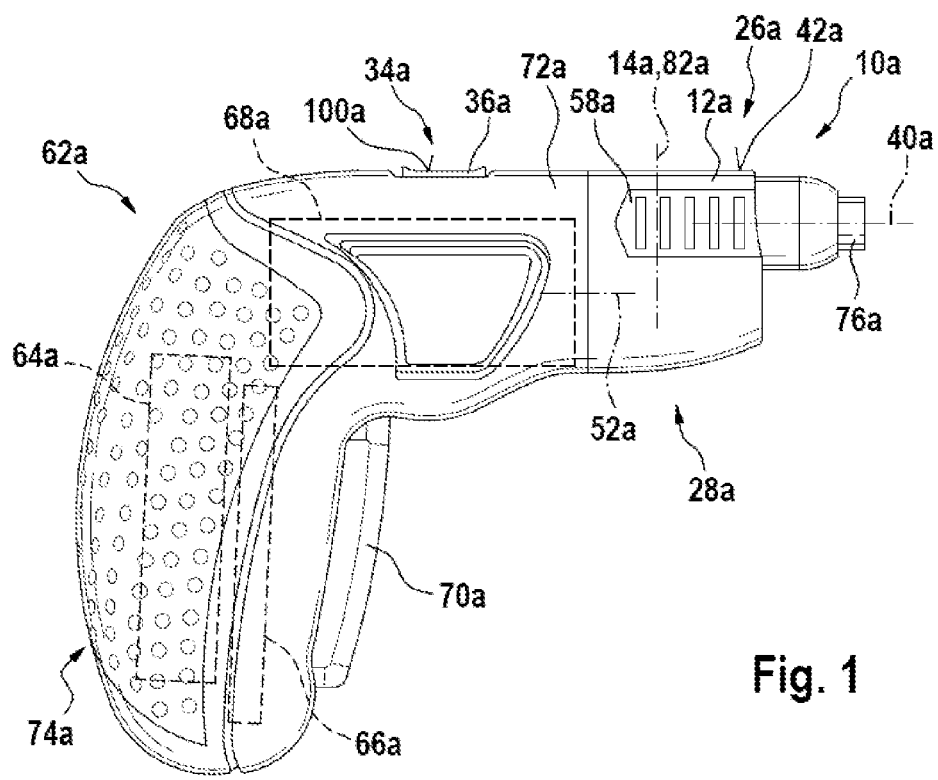
FIG. 1 shows a side view of a hand tool with a hand tool gearing unit according to the disclosure which has a locking unit.

FIG. 1 shows a hand tool 62a comprising a hand tool gearing unit 10a according to the disclosure, a rechargeable battery 64a, electronics 66a, a drive unit 68a, an operating unit 70a and a machine housing 72a. The electronics 66a are provided for supplying the drive unit 68a with electrical energy from the rechargeable battery 64a. A rotational speed of the drive unit 68a is controllable by an operator by means of the operating unit 70a. The machine housing 72a is of pistol-shaped design. It has an overall length of less than 140 mm. The machine housing 72a contains at least the rechargeable battery 64*a*, the electronics 66*a* and the drive unit 68*a*. The machine housing 72*a* is designed as two shells. The machine housing 72*a* has a main handle 74*a*.

Figure 2:
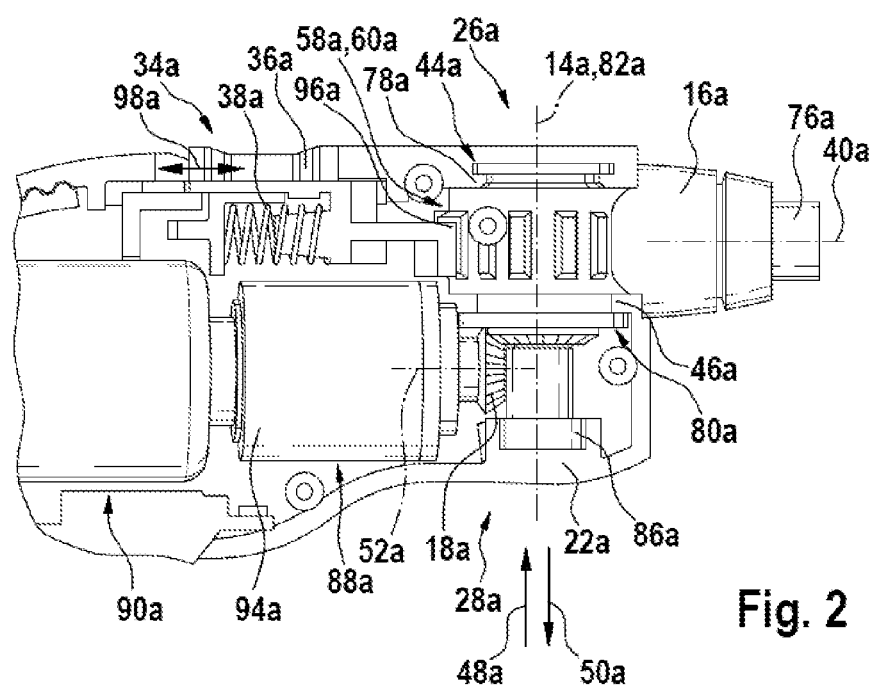
FIG. 2 shows a side view of the hand tool gearing unit from FIG. 1 with an open fixed housing and a closed pivot housing.
Figure 3:
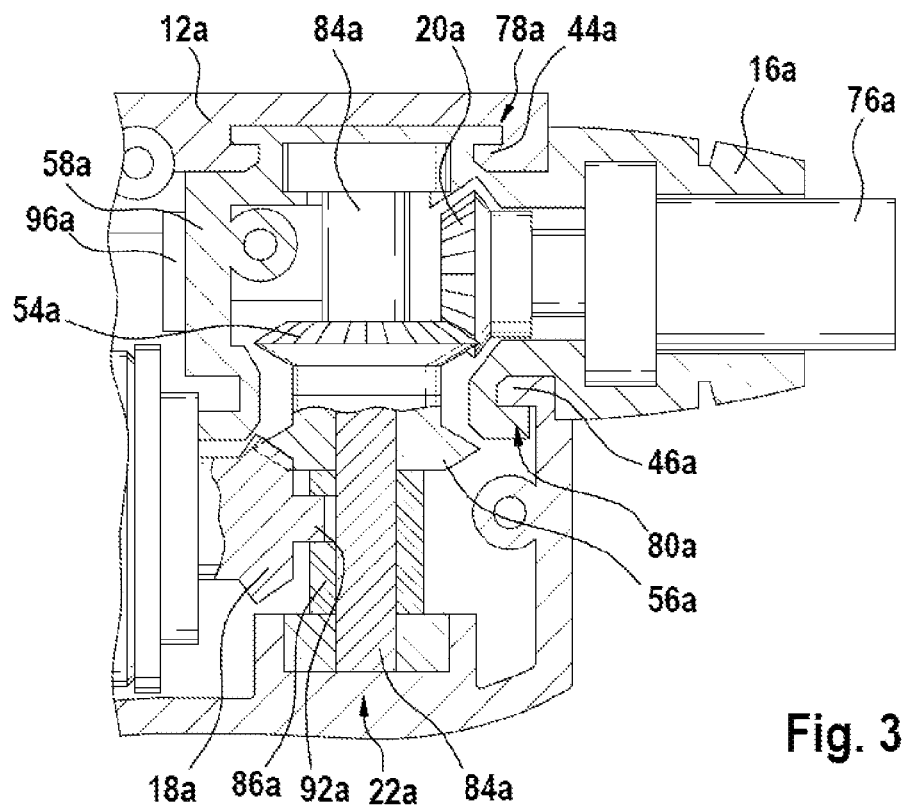
FIG. 3 shows a partially sectioned side view of the hand tool gearing unit from FIG. 1 with the open fixed housing and an open pivot housing.
Figure 4:
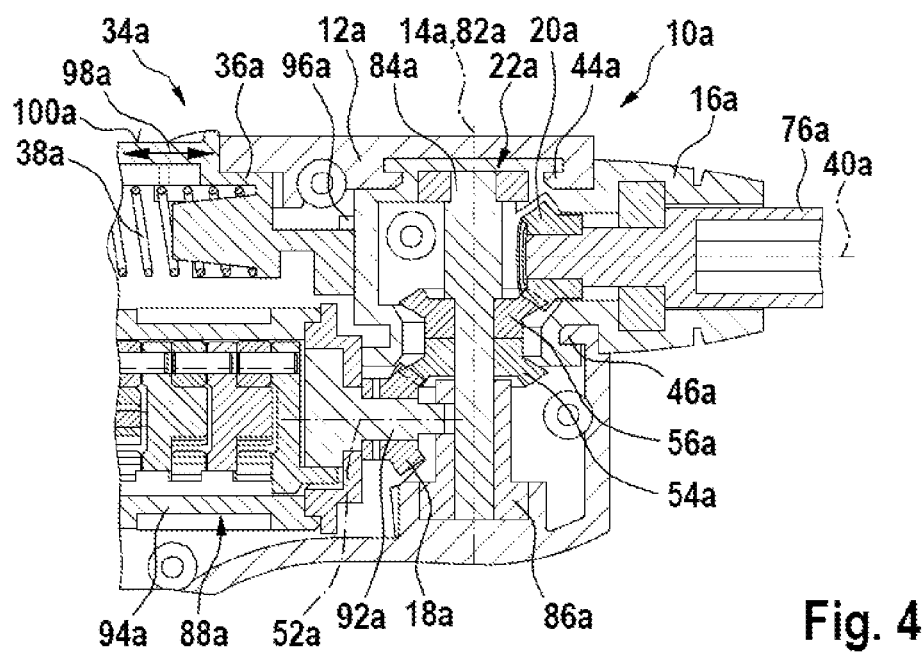
FIG. 4 shows the hand tool gearing unit from FIG. 1 in a sectional illustration.

As FIGS. 2 to 4 in particular show, the hand tool gearing unit 10*a* has at least one fixed housing 12*a*, a pivot housing 16*a*, a driving gearwheel 18*a*, a driven gearwheel 20*a*, a connecting unit 22*a* and an insertable tool fastening means 76*a*. The insertable tool fastening means 76*a* is provided to fasten an insertable tool (not illustrated specifically) so as to be exchangeable by an operator without a tool. The insertable tool fastening means 76*a* shown is provided for fastening a bit. The insertable tool fastening means 76*a* is connected to the driven gearwheel 20*a* for rotation therewith. The driven gearwheel 20*a* is pressed onto a shaft. The shaft is formed integrally with the insertable tool fastening means 76*a*, but could also be connected to the insertable tool fastening means 76*a* for rotation therewith. The insertable tool fastening means 76*a* and the driven gearwheel 20*a* are mounted rotatably in the pivot housing 16*a*. An axis of rotation 40*a* of the driven gearwheel 20*a* does not move relative to the pivot housing 16*a*.

The pivot housing 16*a* is mounted pivotably about a pivot axis 14*a* in the fixed housing 12*a*. The fixed housing 12*a* is formed integrally with the machine housing 72*a*. The fixed housing 12*a* has two fastening means 44*a*, 46*a* which are provided to pivotably fasten the pivot housing 16*a* on two mutually opposite sides 26*a*, 28*a* along the pivot axis 14*a*. The fastening means 44*a*, 46*a* are in each case provided in order to bring about forces on the pivot housing 16*a* at least in two opposite directions 48*a*, 50*a* parallel to the pivot axis 14*a*.

A first of the fastening means 44*a* of the fixed housing 12*a* is designed as a circular groove. The pivot housing 16*a* has a first fastening means 78*a* which is designed as a circular spring. The first fastening means 78*a* of the pivot housing 16*a* is provided to grip into the first fastening means 44*a* of the fixed housing 12*a*. The first fastening means 44*a* of the fixed housing 12*a* and the first fastening means 78*a* of the pivot housing 16*a* are arranged on a side of the connecting unit 22*a* that is remote from the driving gearwheel 18*a*. The first fastening means 44*a* of the fixed housing 12*a* fastens the first fastening means 78*a* of the pivot housing 16*a* when the two-shell fixed housing 12*a* is closed.

A second of the fastening means 46*a* of the fixed housing 12*a* is designed as a circular spring. The pivot housing 16*a* has a second fastening means 80*a* which is designed as a circular groove. The second fastening means 46*a* of the fixed housing 12*a* is provided to grip into the second fastening means 80*a* of the pivot housing 16*a*. The second fastening means 46*a* of the fixed housing 12*a* and the second fastening means 80*a* of the pivot housing 16*a* are arranged on a plane running between the axis of rotation 40*a* of the driven gearwheel 20*a* and an axis of rotation 52*a* of the driving gearwheel 18*a* parallel to at least one of said axes of rotation 40*a*, 52*a*. The plane does not intersect either the driving gearwheel 18*a* or the driven gearwheel 20*a*. The fastening means 44*a*, 46*a*, 78*a*, 80*a* enclose the pivot axis 14*a* annularly over a plane which is oriented perpendicularly to the pivot axis 14*a*.

The axis of rotation 40*a* of the driven gearwheel 20*a* and an outer side 42*a* of the fixed housing 12*a*, which outer side is oriented parallel to the axis of rotation 40*a* of the driven gearwheel 20*a*, are spaced apart from each other by less than 12 mm. The fixed housing 12*a* protrudes over the pivot housing 16*a* along the pivot axis 14*a* on a first of the sides 26*a* by less than 12 mm. The first side 26*a* faces away from the main handle 74*a* of the machine housing 72*a*. The second side 28*a* faces the main handle 74*a* of the machine housing 72*a*.

The connecting unit 22*a* is provided for transmitting a rotational movement from the driving gearwheel 18*a* to the driven gearwheel 20*a*. An axis of rotation 82*a* of the connecting unit 22*a* is oriented perpendicularly to the axis of rotation 40*a* of the driven gearwheel 20*a*. Furthermore, the axis of rotation 82*a* of the connecting unit 22*a* is oriented perpendicularly to the axis of rotation 52*a* of the driving gearwheel 18*a*.

The connecting unit 22*a* comprises a spindle 84*a*, a first gearwheel 54*a* and a second gearwheel 56*a*. The gearwheels 54*a*, 56*a* are pressed onto the spindle 84*a*. The spindle 84*a* is mounted on the first side 26*a* in the pivot housing 16. The spindle 84*a* is mounted on the second side 28*a*, which is spaced apart from the first side 26*a*, in the fixed housing 12*a*. For this purpose, the hand tool gearing unit 10*a* has a bearing bushing 86*a*. The bearing bushing 86*a* is provided for bringing about a fastening force on the first gearwheel 54*a*.

The first gearwheel 54*a* meshes with the driving gearwheel 18*a*. The second gearwheel 56*a* meshes with the driven gearwheel 20*a*. The first gearwheel 54*a* is connected to the second gearwheel 56*a* for rotation therewith. The driving gearwheel 18*a*, the driven gearwheel 20*a*, the first gearwheel 54*a* and the second gearwheel 56*a* are designed as bevel gearwheels. The axis of rotation 40*a* of the driven gearwheel 20*a* is spaced apart radially from the axis of rotation 52*a* of the driving gearwheel 18*a*.

The first gearwheel 54*a* and the second gearwheel 56*a* are arranged at least substantially between the axis of rotation 52*a* of the driving gearwheel 18*a* and the axis of rotation 40*a* of the driven gearwheel 20*a*. Alternatively, a first gearwheel of a connecting unit could also be arranged behind an axis of rotation of the driving gearwheel, as seen from a second gearwheel of the connecting unit. Furthermore, a second gearwheel of a connecting unit could alternatively be arranged behind an axis of rotation of the driven gearwheel, as seen from a first gearwheel of the connecting unit.

The drive unit 68*a* comprises a gearing 88*a* and a motor 90*a*. The motor 90*a* is designed as a brushless, high-speed electric motor. The gearing 88*a* is designed as a planetary gearing. The gearing 88*a* is designed as an assembly which is formed substantially separately from the hand tool gearing unit 10*a*. The gearing 88*a* comprises three planetary gearing stages. The gearing 88*a* is provided for reducing a rotational speed of the motor 90*a* to a rotational speed of the insertable tool fastening means 76*a*. The driving gearwheel 18*a* is connected to an output shaft 92*a* of the gearing 88*a* for rotation with said output shaft. The bearing bushing 86*a* is provided for the mounting of a side of the output shaft 92*a* that faces away from the motor 90*a*. The gearing 88*a* has a gearing housing 94*a* in which the driving gearwheel 18*a* is rotatably mounted. The gearing housing 94*a* is connected in a form-fitting manner and/or non-positively to the machine housing 72*a* and therefore to the fixed housing 12*a*.

The hand tool gearing unit 10*a* has a locking unit 34*a*. The locking unit 34*a* comprises a locking element 36*a*, a locking spring 38*a* and an engagement means 96*a*. The engagement means 96*a* is formed integrally with the pivot housing 16*a*. The locking element 36*a* is mounted non-rotatably and displaceably in the fixed housing 12*a*. The locking element 36*a* is mounted displaceably perpendicularly to the pivot axis 14*a*. The locking element 36*a* is arranged on the first side 26*a* of the fixed housing 12*a*. A direction of movement 98*a* of the locking element 36*a* is parallel to the axis of rotation 52*a* of the driving gearwheel 18*a*. The locking element 36a is provided for producing a non-rotatable connection to the engagement means 96a. The locking element 36a is therefore provided for locking the pivot housing 16a in at least one position relative to the driving gearwheel 18a.

Figure 5:
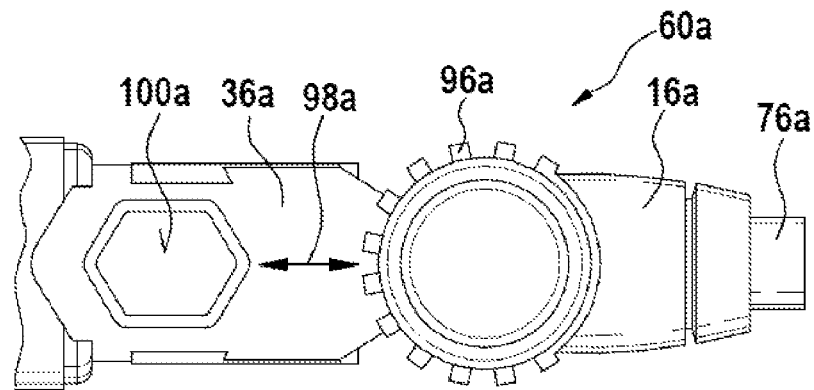
FIG. 5 shows a top view substantially of the locking unit of the hand tool gearing unit from FIG. 1 in a locked operating state.
Figure 6:
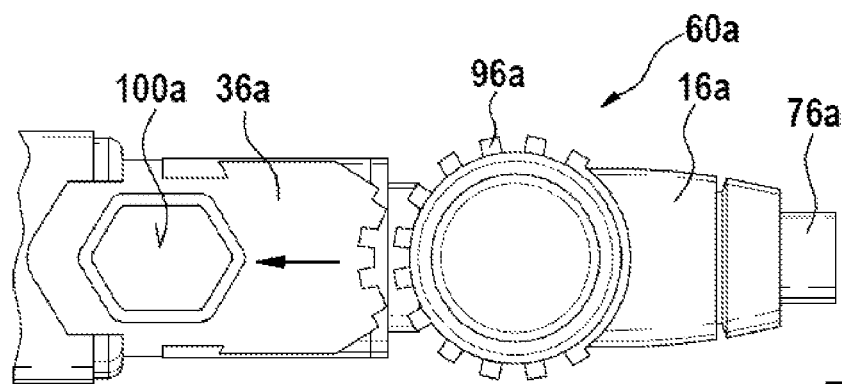
FIG. 6 shows a top view substantially of the locking unit of the hand tool gearing unit from FIG. 1 in an unlocked operating state.

As FIGS. 5 and 6 show, the locking element 36a and the engagement means 96a each have a toothing, wherein the toothings are provided for intermeshing. An angle between two teeth of the toothing is 22.5°. The locking unit 34a is therefore provided for locking the pivot housing 16a in a plurality of positions. The toothings here have substantially rectangular teeth, as a result of which a particularly precise orientation can be achieved in a position. Alternatively or in addition, the teeth of at least one of the toothings could have introductory slopes, and the teeth could be of rounded design and/or the toothing could have a finer tooth spacing, as a result of which the locking can be produced more rapidly. The positions of the locking unit 34a are arranged regularly about the pivot axis 14a. The locking spring 38a presses the locking element 36a in the direction of the engagement means 96a. The locking unit 34a therefore automatically latches the pivot housing 16a and the fixed housing 12a. The locking element 36a has an actuating surface 100a which is provided to be displaced with the locking element 36a by an operator in order to open the locking means. The operator displaces the locking element 36a here towards the locking spring 38a.

The pivot housing 16a has a hinged closure 58a which is provided for covering a pivot region 60a of the fixed housing 12a, through which pivot region the shaft driving the insertable tool fastening means 76a emerges out of the fixed housing 12a, in the different positions of the pivot housing 16a. The hinged closure 58a encloses the pivot axis 14a by more than 270° over a plane oriented perpendicularly to the pivot axis 14a. The hinged closure 58a here completely encloses the pivot axis 14a over the plane. The engagement means 96a is arranged on the hinged closure 58a, specifically on a side of the hinged closure 58a that faces away from the insertable tool fastening means 76a.

Two further exemplary embodiments of the disclosure are shown in FIGS. 7 to 11. The descriptions below and the drawing are restricted substantially to the differences between the exemplary embodiments, wherein reference can also be made in principle to the drawing and/or the description of the other exemplary embodiments, in particular to FIGS. 1 to 6, with regard to components with an identical designation, in particular in relation to components with identical reference numbers. In order to distinguish between the exemplary embodiments, the letter a is placed after the reference numbers of the exemplary embodiment in FIGS. 1 to 6. The letter a is replaced by the letter b or c in the exemplary embodiments of FIGS. 7 to 11.

Figure 7:
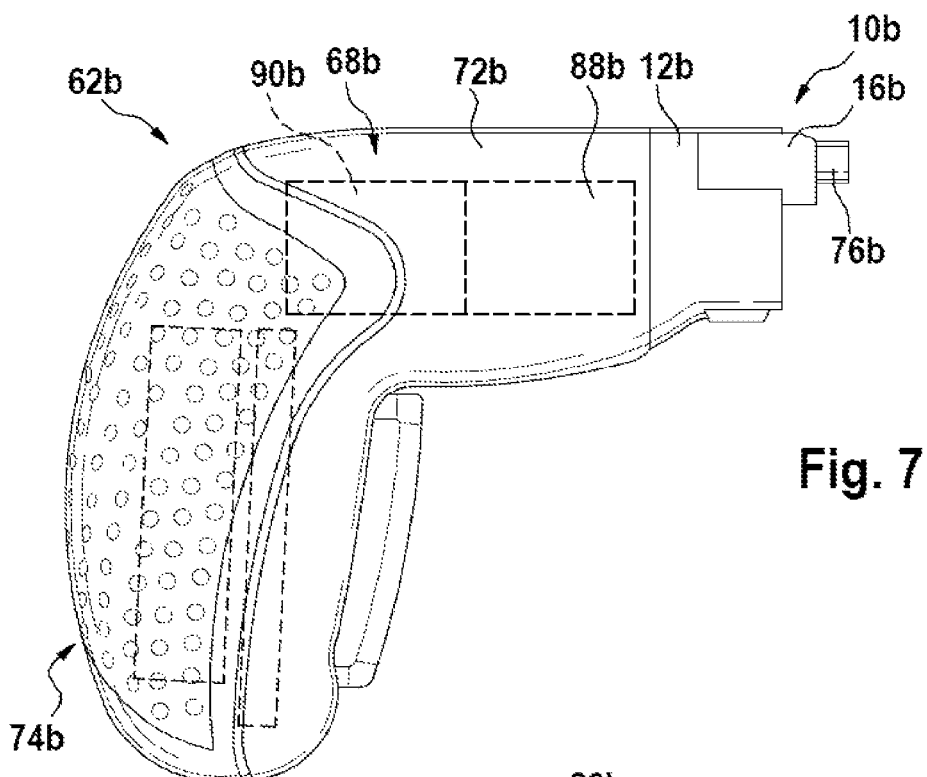
FIG. 7 shows a side view of a hand tool with an alternative exemplary embodiment to the hand tool gearing unit from FIG. 1.
Figure 8:
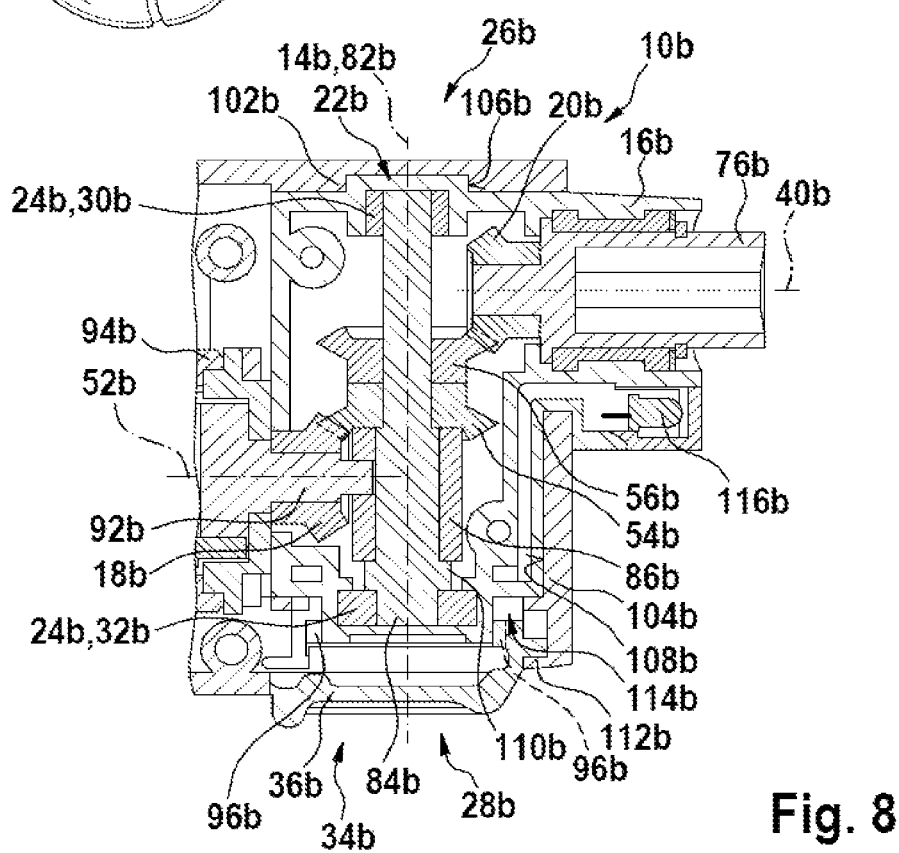
FIG. 8 shows a section of the hand tool gearing unit from FIG. 7.
Figure 9:
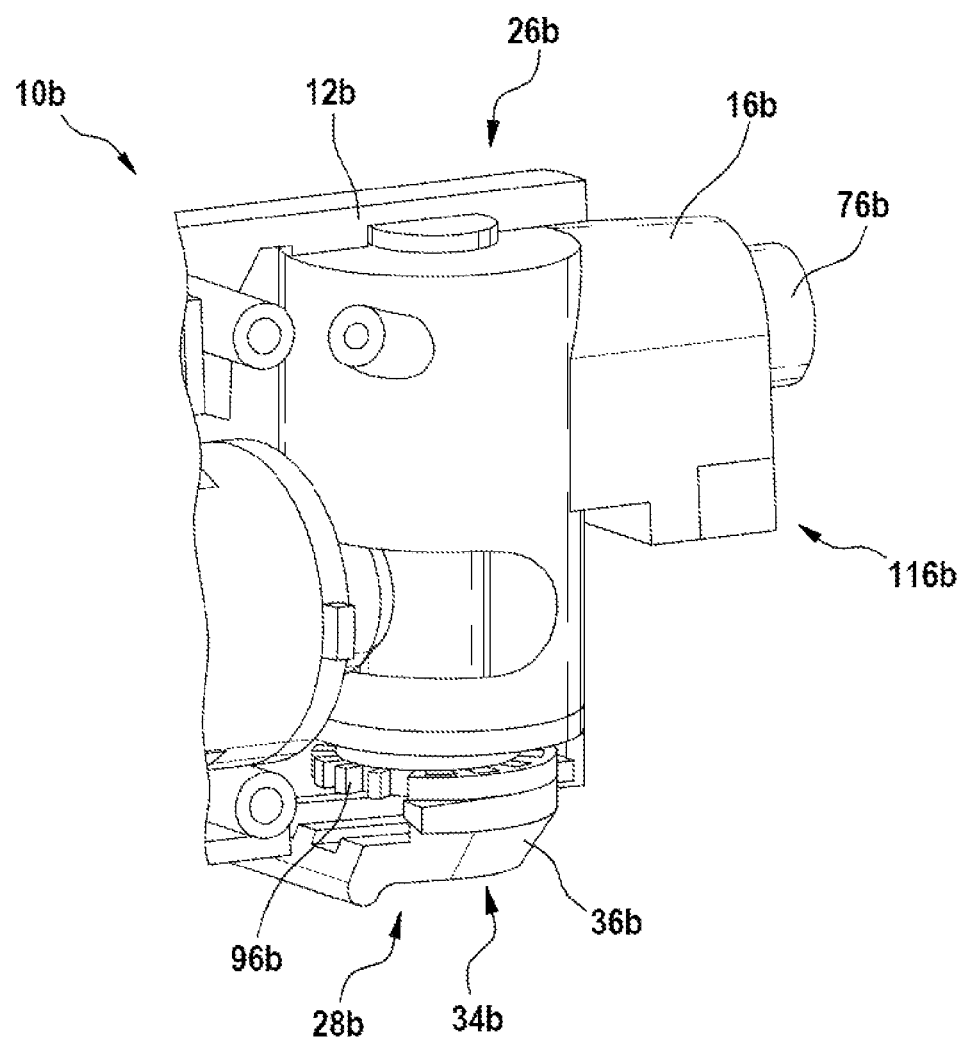
FIG. 9 shows the hand tool gearing unit from FIG. 7 in a perspective illustration with an open fixed housing.

FIGS. 7 to 9 show a hand tool 62b comprising a hand tool gearing unit 10b according to the disclosure, a drive unit 68b and a machine housing 72b. The hand tool gearing unit 10b comprises a fixed housing 12b, a pivot housing 16b, a driving gearwheel 18b, a driven gearwheel 20b, a connecting unit 22b, a locking unit 34b and an insertable tool fastening means 76b. The insertable tool fastening means 76b is connected to the driven gearwheel 20b for rotation therewith. The insertable tool fastening means 76b and the driven gearwheel 20b are mounted rotatably directly in the pivot housing 16b. An axis of rotation 40b of the driven gearwheel 20b is immovable relative to the pivot housing 16b.

The connecting unit 22b comprises a spindle 84b, a first gearwheel 54b and a second gearwheel 56b. The gearwheels 54b, 56b are pressed onto the spindle 84b. The connecting unit 22b is provided for transmitting a rotational movement from the driving gearwheel 18b to the driven gearwheel 20b. An axis of rotation 82b of the connecting unit 22b is oriented perpendicularly to the axis of rotation 40b of the driven gearwheel 20b. Furthermore, the axis of rotation 82b of the connecting unit 22b is oriented perpendicularly to an axis of rotation 52b of the driving gearwheel 18b.

The pivot housing 16b is mounted pivotably about a pivot axis 14b in the fixed housing 12b. The fixed housing 12b is formed integrally with the machine housing 72b of the hand tool 62b. The fixed housing 12b has two bearing means 102b, 104b which are provided to fasten the pivot housing 16b pivotably on two mutually opposite sides 26b, 28b along the pivot axis 14b. The two bearing means 102b, 104b of the fixed housing 12b are formed integrally with a remainder of the fixed housing 12b, but could also be formed separately. The bearing means 102b, 104b here are designed as cylindrical depressions. The bearing means 102b, 104b are arranged on an inner side of the fixed housing 12b, said inner side facing the pivot housing 16b. The bearing means 102b, 104b act directly on bearing surfaces 106b, 108b of the pivot housing 16b. The bearing surfaces 106b, 108b of the pivot housing 16b are designed at least in the shape of a partial cylinder jacket.

A bearing unit 24b of the hand tool gearing unit 10b has a first bearing means 30b which rotatably mounts the spindle 84b of the connecting unit 22b on a first of the sides 26b in the pivot housing 16b. The bearing unit 24b has a second bearing means 32b which rotatably mounts the spindle 84b of the connecting unit 22b on a second of the sides 28b, which is spaced apart from the first side 26b, likewise in the pivot housing 16b. The first side 26b faces away from a main handle 74b of the machine housing 72b. The second side 28b faces the main handle 74b of the machine housing 72b. The bearing means 30b, 32b of the bearing unit 24b are designed as plain bearings. The pivot housing 16b supports the connecting unit 22b in the axial direction on at least one side. In addition, at least one of the bearing means 32b supports the connecting unit 22b in the axial direction on at least one side.

During installation, the connecting unit 22b and the driven gearwheel 20b with the insertable tool fastening means 76b are placed into a shell of the pivot housing 16b. By connection of another shell of the pivot housing 16b to this shell, the connecting unit 22b and the driven gearwheel 20b with the insertable tool fastening means 76b are connected in the pivot housing 16b to form a preassemblable assembly.

The drive unit 68b comprises a gearing 88b and a motor 90b. The driving gearwheel 18b is connected to an output shaft 92b of the gearing 88b for rotation with said output shaft. The gearing 88b has a gearing housing 94b in which the driving gearwheel 18b is rotatably mounted. The gearing housing 94b is connected in a form-fitting manner and/or non-positively to the machine housing 72b and therefore to the fixed housing 12b.

The pivot housing 16b bounds an opening through which the output shaft 92b of the gearing 88b projects into the pivot housing 16b. In addition, the pivot housing 16b bounds an opening through which the insertable tool fastening means 76b projects out of the pivot housing 16b. Apart from said two openings, the pivot housing 16b is at least substantially completely closed.

The hand tool gearing unit 10b has a bearing bushing 86b which is provided for the mounting of a side of the output shaft 92b that faces away from the motor 90b. The bearing bushing 86b encloses the spindle 84b of the connecting unit 22b over a plane. The spindle 84b fastens the bearing bushing 86b so as to be rotatable at least in a radial direction relative to the spindle 84b. The bearing bushing 86b is fastened in the axial direction between an axial stop 110b of the spindle 84b and one of the gearwheels 54b of the connecting unit 22b.

The locking unit 34b has a locking element 36b, a locking spring and an engagement means 96b. The locking element 36b is mounted in the fixed housing 12b so as to be non-rotatable and to be displaceable parallel to the pivot axis 14b. The locking element 36b is arranged on a side 28b of the pivot axis 14b that faces away from the driven gearwheel 20b. The pivot axis 14b intersects the locking element 36b. The engagement means 96b is connected non-rotatably to the pivot housing 16b. The engagement means 96b is formed integrally here with the pivot housing 16b. The locking spring (not illustrated specifically) presses the locking element 36b against a stop 112b parallel to the pivot axis 14b. When the locking element 36b bears against the stop 112b, a toothing of the locking element 36b and a toothing of the engagement means 96b are in engagement. The pivot housing 16b is then locked in a position relative to the driving gearwheel 18b.

The pivot housing 16b bounds a groove 114b into which the toothing of the locking element 36b is movable by an operator. For this purpose, the operator displaces the locking element 36b counter to a force of the locking spring. When the toothing of the locking element 36b is arranged in the groove 114b, the pivot housing 16b is pivotable relative to the fixed housing 12b by the operator. The hand tool gearing unit 10b has an illuminating means 116b arranged pivotably with the pivot housing 16b.

Figure 10:
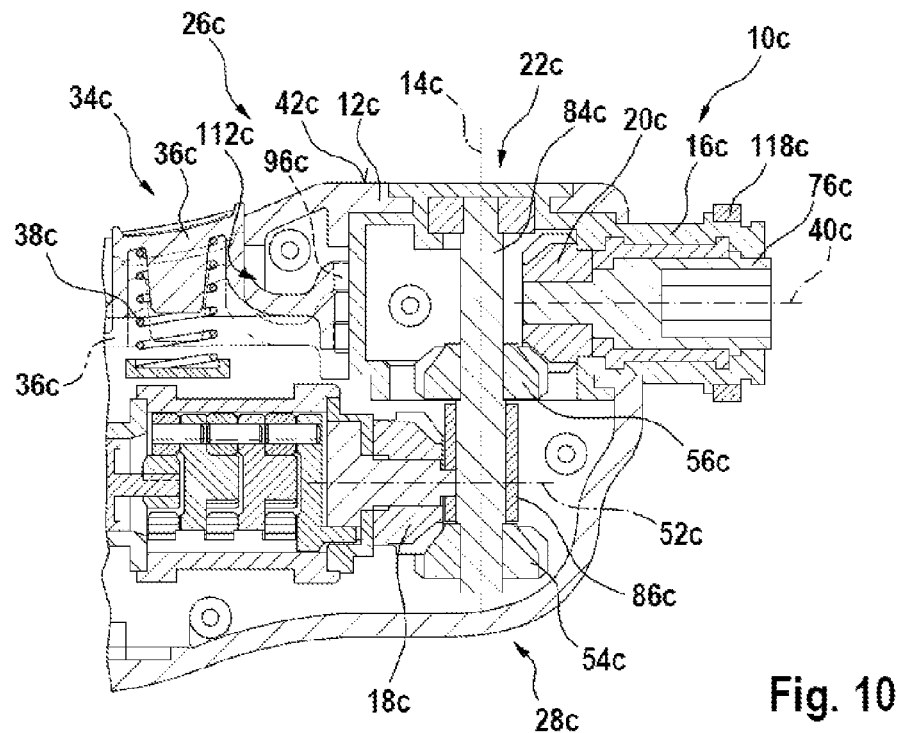
FIG. 10 shows a further alternative exemplary embodiment to the hand tool gearing unit from FIG. 1 in a sectional illustration.
Figure 11:
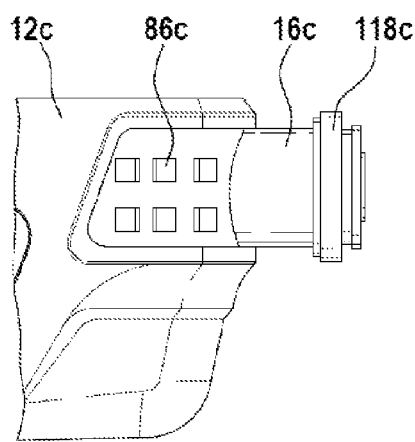
FIG. 11 shows the hand tool gearing unit from FIG. 10 in a side view.

FIGS. 10 and 11 show a hand tool gearing unit 10c according to the disclosure comprising a fixed housing 12c, a pivot housing 16c, a driving gearwheel 18c, a driven gearwheel 20c, a connecting unit 22c, a locking unit 34c and an insertable tool fastening means 76c. The driving gearwheel 18c has an axis of rotation 52c which is spaced apart radially from an axis of rotation 40c of the driven gearwheel 20c. The pivot housing 16c is mounted pivotably relative to the driving gearwheel 18c and the fixed housing 12c about a pivot axis 14c. The driven gearwheel 20c is mounted rotatably about the axis of rotation 40c in the pivot housing 16c. The driven gearwheel 20c is connected to the insertable tool fastening means 76c for rotation therewith.

The connecting unit 22c comprises a spindle 84c, a first gearwheel 54c and a second gearwheel 56c. The first gearwheel 54c meshes with the driving gearwheel 18c, the second gearwheel 56c meshes with the driven gearwheel 20c. The gearwheels 54c, 56c are connected to each other for rotation with each other. The gearwheels 54c, 56c are pressed onto the spindle 84c. Alternatively, gearwheels could be interlocked with a spindle and/or with each other. The first gearwheel 54c of the connecting unit 22c is arranged behind the axis of rotation 52c of the driving gearwheel 18c, as seen from the second gearwheel 56c of the connecting unit 22c. The second gearwheel 56c is arranged at least substantially between the axis of rotation 52c of the driving gearwheel 18c and the axis of rotation 40c of the driven gearwheel 20c.

The spindle 84c is mounted on a first side 26c, which side faces away from the driving gearwheel 18c, in the pivot housing 16c. The spindle 84c is mounted on a second side 28c, which side faces the driving gearwheel 18c and is spaced apart from the first side 26c, in the fixed housing 12c. For this purpose, the hand tool gearing unit 10c has a bearing bushing 86c. Furthermore, the bearing bushing 86c is provided for mounting the driving gearwheel 18c on a side facing away from a motor. The fixed housing 12c secures the bearing bushing 86c.

The locking unit 34c has a locking element 36c, a locking spring 38c and engagement means 96c. The locking element 36c is mounted non-rotatably relative to the fixed housing 12c and is displaceable parallel to the pivot axis 14c. The locking element 36c is arranged so as to be operable from the first side 26c of the pivot axis 14c, which side faces away from the driving gearwheel 18c. The locking element 36c is illustrated in a position in which it secures the pivot housing 16c non-rotatably, and is illustrated by dashed lines in a further position in which the pivot housing 16c is rotatable by an operator. The engagement means 96c are connected to the pivot housing 16c for rotation therewith. The engagement means 96c are formed integrally here with the pivot housing 16c.

The locking spring 38c presses the locking element 36c parallel to the pivot axis 14c against a stop 112c. When the locking element 36c bears against the stop 112c, a toothing of the locking element 36c and a toothing of the engagement means 96c are in engagement. The pivot housing 16c is locked in a position relative to the driving gearwheel 18c.

The engagement means 96c are in each case designed as at least two cuboidal formations on the pivot housing 16c. The two formations are arranged spaced apart from each other by a distance in the direction of the pivot axis 14c. The toothing of the locking element 36c likewise has two formations, which are spaced apart from each other by the distance, on the locking element 36c. When the locking element 36c is actuated, one of the formations on the locking element 36c lies between the two formations on the engagement means 96c. By the division of the engagement means 96c into two formations in each case, a particularly stable toothing can be achieved with an advantageously short actuating distance of the locking element 36c.

When the operator displaces the locking element 36c counter to a force of the locking spring 38c, the engagement between the toothing of the locking element 36c and the toothing of the engagement means 96c is released. The pivot housing 16c is then pivotable relative to the fixed housing 12c by the operator.

The pivot housing 16c has two interconnected housing shells which are separated from each other along the section plane illustrated in FIG. 10. The two housing shells are screwed to each other on a side facing away from the insertable tool fastening means 76c. On a side facing the insertable tool fastening means 76c, the housing shells are connected to each other by a connecting ring 118c which is pressed onto the pivot housing 16c.

What is claimed is:
1. A hand tool gearing unit, comprising:
   a fixed housing;
   a pivot housing pivotably mounted relative to the fixed housing about a pivot axis;
   a driving gearwheel;
   a driven gearwheel mounted in the pivot housing; and
   a connecting unit configured to transmit a rotational movement from the driving gearwheel to the driven gearwheel,
   wherein the pivot housing is configured to connect the connecting unit and the driven gearwheel to form a preassemblable assembly, including the pivot housing, the connecting unit and the driven gearwheel, mountable in said fixed housing.

2. The hand tool gearing unit according to claim 1, further comprising at least one bearing unit configured to rotatably mount the connecting unit on at least one side only in the pivot housing.

3. The hand tool gearing unit according to claim 2, wherein the bearing unit includes two bearing members configured to rotatably mount the connecting unit on two mutually opposing sides along the pivot axis in the pivot housing.

4. The hand tool gearing unit according to claim 2, wherein the bearing unit includes two bearing members configured to rotatably mount the connecting unit on one side in the pivot housing and on another side in the fixed housing.

5. The hand tool gearing unit according to claim 1, further comprising a locking unit that includes a locking element configured to lock the pivot housing in at least one position relative to the driving gearwheel.

6. The hand tool gearing unit according to claim 5, wherein the locking unit is further configured to lock the pivot housing in a plurality of positions.

7. The hand tool gearing unit according to claim 6, wherein the plurality of positions are distributed regularly about the pivot axis.

8. The hand tool gearing unit according to claim 5, wherein, in an operating state, the locking element is configured to produce a form-fitting connection with the pivot housing.

9. The hand tool gearing unit according to claim 5, wherein the locking unit includes a locking spring configured to press onto the locking element in at least one operating state.

10. The hand tool gearing unit according to claim 5, wherein the locking element is displaceably mounted substantially perpendicular to the pivot axis.

11. The hand tool gearing unit according to claim 5, wherein the locking element is displaceably mounted substantially parallel to the pivot axis.

12. The hand tool gearing unit according to claim 1, wherein, the driving gearwheel comprises an axis of rotation spaced apart radially from an axis of rotation of the driven gearwheel.

13. The hand tool gearing unit according to claim 1, wherein the connecting unit is configured to transmit the rotational movement in at least a substantially step-down-free manner.

14. The hand tool gearing unit according to claim 1, wherein the connecting unit includes two gearwheels positioned separately from each other.

15. The hand tool gearing unit according to claim 1, further comprising a hinged closure configured to:
at least partially close a pivot region; and
enclose the pivot axis over at least one plane.

16. A hand tool comprising:
a hand tool gearing unit according to claim 1; and
a tool fastening means configured for fastening a tool thereto, said tool fastening rotationally connected to said driven gearwheel.

17. A hand tool gearing unit, comprising:
a fixed housing;
a pivot housing pivotably mounted relative to the fixed housing about a pivot axis;
a driving gearwheel;
a driven gearwheel mounted in the pivot housing;
a connecting unit configured to transmit a rotational movement from the driving gearwheel to the driven gearwheel,
wherein the fixed housing includes an outer side which is oriented at least substantially parallel to an axis of rotation of the driven gearwheel and is spaced apart from the axis of rotation by less than 12 mm.

18. The hand tool gearing unit according to claim 17, further comprising a locking unit that includes a locking element configured to lock the pivot housing in at least one position relative to the driving gearwheel, wherein the locking element is positioned on a side opposite the outer side.

19. A hand tool gearing unit, comprising:
a fixed housing;
a pivot housing pivotably mounted relative to the fixed housing about a pivot axis;
a driving gearwheel;
a driven gearwheel mounted in the pivot housing;
a connecting unit configured to transmit a rotational movement from the driving gearwheel to the driven gearwheel; and
two fastening members configured to pivotably fasten the pivot housing to the fixed housing on two mutually opposite sides of the pivot housing along the pivot axis and to transmit forces on the pivot housing in at least two opposite directions parallel to the pivot axis.

20. The hand tool gearing unit according to claim 19, wherein the two fastening members fasten the pivot housing to the pivot axis with a form-fitting connection.

21. The hand tool gearing unit according to claim 19, wherein the two fastening members are configured to be at least a part of a tongue and groove connection.

22. A hand tool comprising:
a gearing unit that includes:
a fixed housing;
a pivot housing mounted pivotably relative to the fixed housing about a pivot axis;
a driving gearwheel;
a driven gearwheel mounted in the pivot housing;
a connecting unit configured to transmit a rotational movement from the driving gearwheel to the driven gearwheel; and
a hinged closure configured to at least partially closer a pivot region and to enclose the pivot axis over at least one plane.

* * * * *

UNITED STATES PATENT AND TRADEMARK OFFICE
CERTIFICATE OF CORRECTION

| | | |
|---|---|---|
| PATENT NO. | : 9,440,348 B2 | |
| APPLICATION NO. | : 14/200181 | |
| DATED | : September 13, 2016 | |
| INVENTOR(S) | : Julia Rommel | |

It is certified that error appears in the above-identified patent and that said Letters Patent is hereby corrected as shown below:

In the Claims

In Column 16, Lines 52-54, Lines 11-13 of Claim 22 should read:

a hinged closure configured to at least partially close
    a pivot region and to enclose the pivot axis over at
    least one plane.

Signed and Sealed this
Third Day of January, 2017

Michelle K. Lee
*Director of the United States Patent and Trademark Office*